US008456467B1

(12) United States Patent
Hickman et al.

(10) Patent No.: US 8,456,467 B1
(45) Date of Patent: Jun. 4, 2013

(54) EMBEDDABLE THREE-DIMENSIONAL (3D) IMAGE VIEWER

(75) Inventors: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/564,911

(22) Filed: Aug. 2, 2012

Related U.S. Application Data

(60) Provisional application No. 61/558,901, filed on Nov. 11, 2011, provisional application No. 61/640,484, filed on Apr. 30, 2012.

(51) Int. Cl.
*G06T 15/00* (2011.01)
(52) U.S. Cl.
USPC .......................................... 345/419; 345/650
(58) Field of Classification Search
USPC ............................................... 345/419, 650
See application file for complete search history.

(56) References Cited

U.S. PATENT DOCUMENTS

| 2002/0093538 A1* | 7/2002 | Carlin ........................... 345/778 |
| 2002/0154174 A1* | 10/2002 | Redlich et al. ................. 345/848 |
| 2004/0239679 A1* | 12/2004 | Ito et al. ......................... 345/555 |
| 2006/0119618 A1* | 6/2006 | Knighton et al. ............. 345/619 |

OTHER PUBLICATIONS

Autodesk 123D Catch, Catch and carry, Turn ordinary photos into extraordinary 3D models, www.123dapp.com/catch, 2013.

* cited by examiner

*Primary Examiner* — Maurice L McDowell, Jr.
(74) *Attorney, Agent, or Firm* — McDonnell Boehnen Hulbert & Berghoff LLP

(57) ABSTRACT

Methods and systems for providing a three-dimensional (3D) image viewer in a webpage are provided. According to an example method, a webpage may be provided, and the webpage may include embedded language that identifies a 3D image viewer to be provided within the webpage. Based on the embedded language, a computer having a processor and a memory may request information associated with rendering a 3D object data model in the 3D image viewer. The method may also include providing the 3D image viewer within the webpage, and receiving information associated with rendering the 3D object data model. Additionally, the 3D object data model may be rendered in the 3D image viewer based on the received information. Additional example systems and methods are described herein.

23 Claims, 10 Drawing Sheets

EMBEDDABLE THREE-DIMENSIONAL (3D) IMAGE VIEWER

CROSS-REFERENCE TO RELATED APPLICATIONS

This application claims the benefit of, and incorporates by reference in their entirety, the following U.S. Provisional Patent Applications: U.S. Provisional Application No. 61/558,901 filed on Nov. 11, 2011 and U.S. Provisional Application No. 61/640,484 filed on Apr. 30, 2012.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of an object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that comprises providing a webpage. The webpage may include embedded language that identifies a three-dimensional (3D) image viewer to be provided within the webpage. Based on the embedded language, a computer having a processor and a memory may request information associated with rendering a 3D object data model in the 3D image viewer. The embedded language may further identify the 3D object data model and one or more parameters associated with rendering the 3D object data model. The method may further include providing the 3D image viewer within the webpage, and receiving the information associated with rendering the 3D object data model. According to the method, the 3D object data model may be rendered in the 3D image viewer based on the received information.

In another example aspect, a non-transitory computer-readable medium have stored therein instructions executable by a computing device to cause the computing device to perform functions is provided. The functions may include providing a webpage. The webpage may include embedded language that identifies a three-dimensional (3D) image viewer to be provided within the webpage. Based on the embedded language, information associated with rendering a 3D object data model in the 3D image viewer may be requested. The embedded language may further identify the 3D object data model and one or more parameters associated with rendering the 3D object data model. The functions may further include providing the 3D image viewer within the webpage and receiving the information associated with rendering the 3D object data model. According to the functions, the 3D object data model may be rendered in the 3D image viewer based on the received information.

In still another example aspect, a method is provided that comprises receiving from a client device a request for rendering a 3D object data model within a 3D image viewer of a webpage. The request may include one or more parameters associated with the 3D image viewer and one or more parameters associated with rendering the 3D object data model. The method may further include determining a 3D image viewer based on the one or more parameters associated with the 3D image viewer, and determining information associated with rendering the 3D object data model based on the one or more parameters associated with rendering the 3D object data model. The method may also include providing the 3D image viewer to the client device, and providing the information associated with rendering the 3D object data model to the client device.

In yet another example aspect, a system is provided that comprises a client device and a server. The client device may be configured to request information associated with rendering a three-dimensional (3D) object data model in a 3D image viewer from the server. A webpage having embedded language may be provided on the client device, and a request may be determined based on the embedded language. The server may be configured to determine a 3D image viewer and determine information associated with rendering a 3D object data model based on the request. Additionally, the server may be configured to provide the 3D image viewer and the information associated with rendering the 3D object data model to the client device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing a three-dimensional (3D) image viewer in a webpage. In some examples, markup language for a webpage (e.g., HTML) may include embedded language for creating a 3D image viewer in a webpage. A webmaster may use JavaScript for example to interact with an application programming interface (API) and control rendering of 3D images within the 3D image viewer. In some examples, the API and associated customization parameters may provide a high level command set for embedding real-time, interactive 3D object data models within a webpage.

Figure 1:
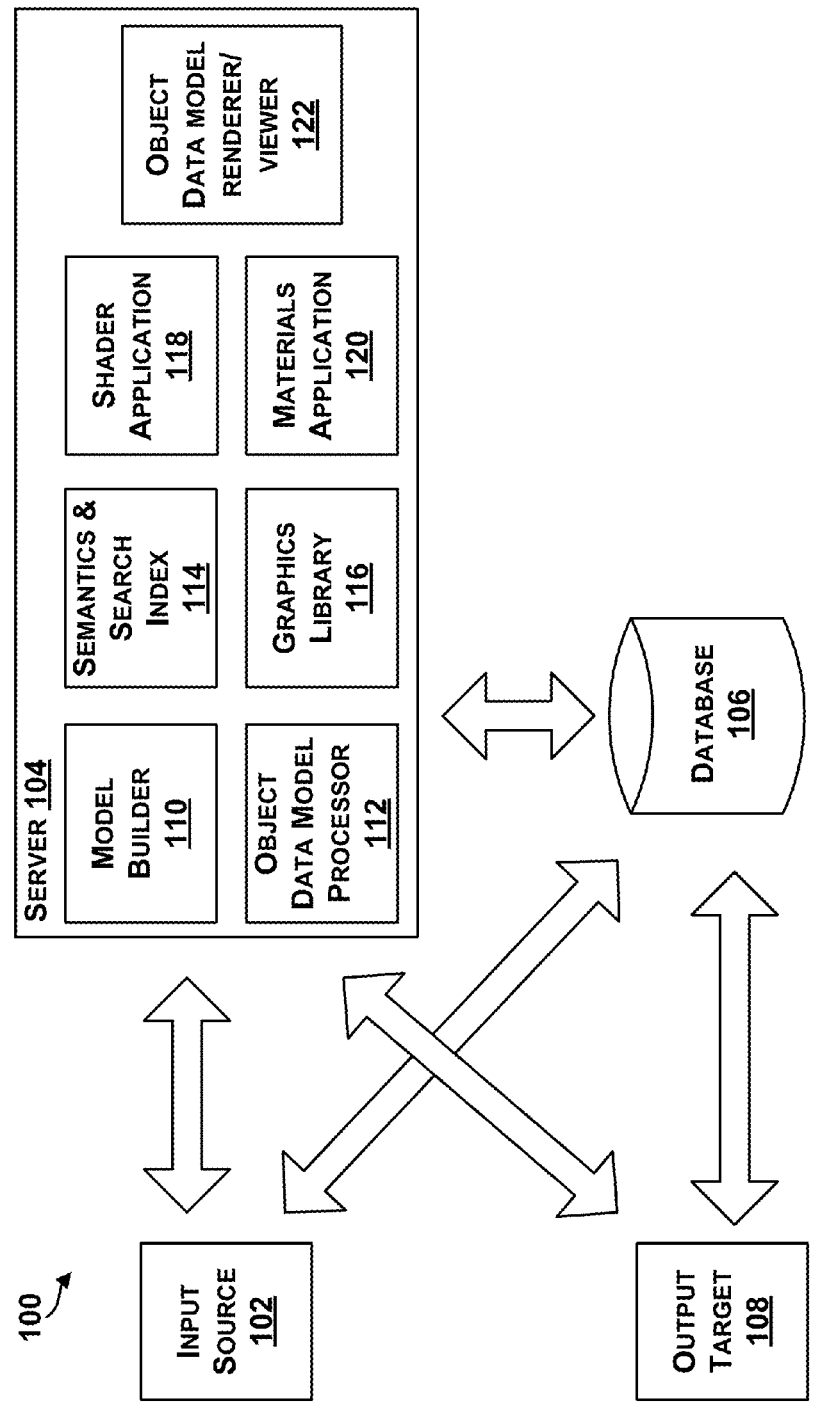
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
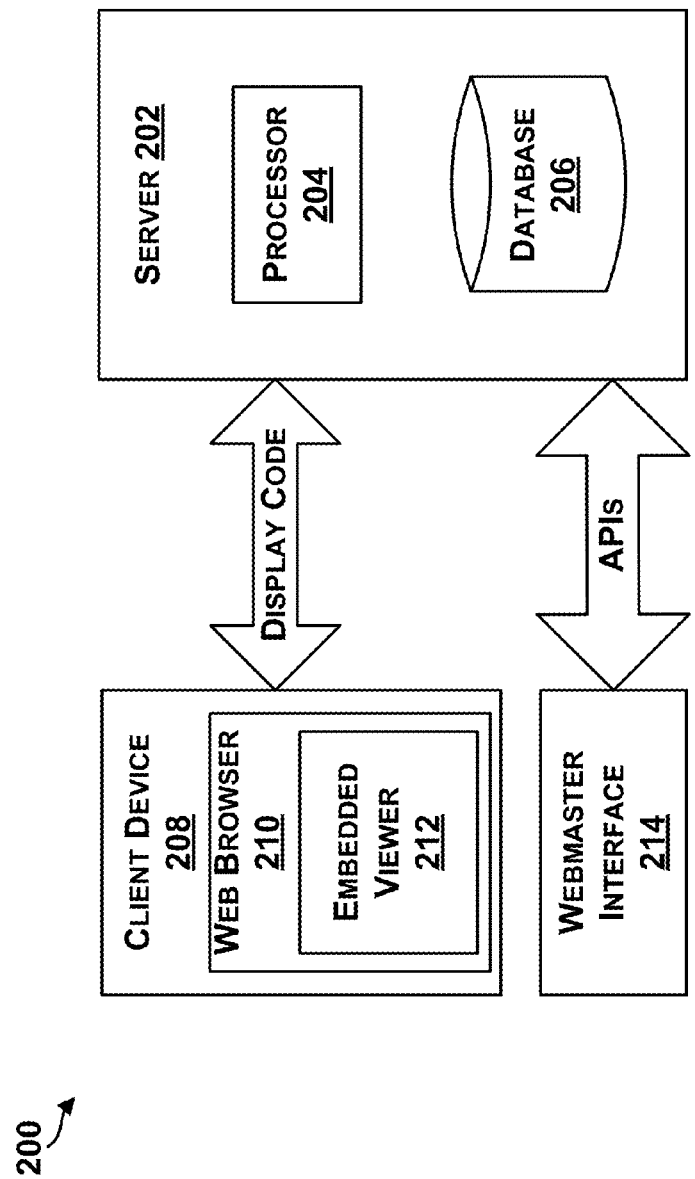
FIG. 2 illustrates an example system for providing a three-dimensional (3D) image viewer.

FIG. 2 illustrates an example system 200 for providing a three-dimensional (3D) image viewer. The system may include a server 202 including a processor 204 and database 206. The server 202 may be configured to provide information associated with 3D object data models to one or more output targets. For example, the processor 204 may be coupled to the database 206, and the database 206 may include information associated with a plurality of 3D object data models. In one instance, the server 202 may be configured to serve a rendered 3D image and/or instructions for rendering a 3D image using graphics software such as WebGL, OpenGL ES, etc., to a client device 208. The 3D image may be a real-time, interactive 3D object data model in some instances.

In one example, WebGL may be used to render a 3D object data model within a web browser 210 on the client device 208. For example, based on information received from the server 202, the web browser 210 may display a webpage having an embedded viewer 212.

In some examples, the embedded viewer 212 may be embedded directly within a webpage with JavaScript or other scripting languages. For example, JavaScript may be used to render an iframe (or inline frame). In other examples, the embedded viewer 212 may be included within a webpage by pasting a block or section of HTML into code for the webpage. The block of HTML may describe information associated with parameters for customizing a 3D image viewer. For instance, the block of HTML may identify a 3D object data model to be accessed from the database 206 of the server 202.

The system 200 may also include a webmaster interface 214. In some examples, a user may configure parameters of the embedded viewer 212 using an application programming interface (API) and the webmaster interface 214. For example, the API may be a set of rules and specifications that a user can follow to communicate with the server 202. In one instance, the API may define vocabularies or function-calling conventions associated with the processor 204 and database 206. In another instance, the API may include specifications of routines, data structures, object classes, protocols, etc. to communication with software in the server 202 using language of the webpage (e.g., JavaScript). A user may select options for a 3D image viewer or input code within a template using the webmaster interface 214. Subsequently, a processor may generate code according to the API specifications that a user may paste into embedded language of a webpage. In some instances, the webmaster interface 214 may provide a high level interface (e.g., more simple) for controlling a 3D image rendered using complex graphics software (e.g., WebGL).

In some examples, the generated code may include HTML language referencing a version of the API and/or server hosting the API. In one example, the API may be a public API that is freely available. In other examples, the API may be licensed to authorized retailers for a fee. For example, retailers may wish to embed 3D image viewers within a webpage to display a 3D object data model of one or more of their products and seek a license to use the API.

Using the webmaster interface 214, a user may define parameters for customizing the embedded viewer 212 (e.g., size, background, user interface options, etc.) as well as parameters for customizing/controlling a rendering of a 3D object data model within the embedded viewer 212 (e.g., size, animation, camera angle, orientation, zoom level, color, texture, shading, overlays, etc.). In some examples, the user may be able to make a customized version of the embedded viewer 212 by coding a modified embedded viewer manually (e.g., without the user of the webmaster interface 214). This may allow the user to incorporate advanced features specific to a given type of embedded viewer.

In other examples, the webmaster interface 214 may facilitate providing an embedded viewer within a webpage by use of drag-and-drop functionality. For example, a user may select an embedded viewer type from the webmaster interface 214, drag the selected viewer onto code for the webpage, and drop the embedded viewer within the webpage code. In one instance, the webmaster interface 214 may be provided on a website. A user may select parameters associated with the embedded viewer via the website, and drag-and-drop a customized embedded viewer to a webpage. In a further example, the user may be prompted to provide parameters upon dropping an embedded viewer object onto code for a webpage. For example, the user may be prompted to input information about a size or color of the embedded viewer, a 3D object data model to be provided within the embedded viewer, a pose or other parameters associated with the 3D object data model, an animation sequence for a camera (such as a series of camera poses and corresponding time stamps) or the 3D object data model (such as a series of object poses and time stamps), etc., after dropping the embedded viewer into a block of code.

Thus, in some examples, the system 200 may enable a 3D image viewer to be provided within a webpage and controlled using high level API scripting.

Figure 3:
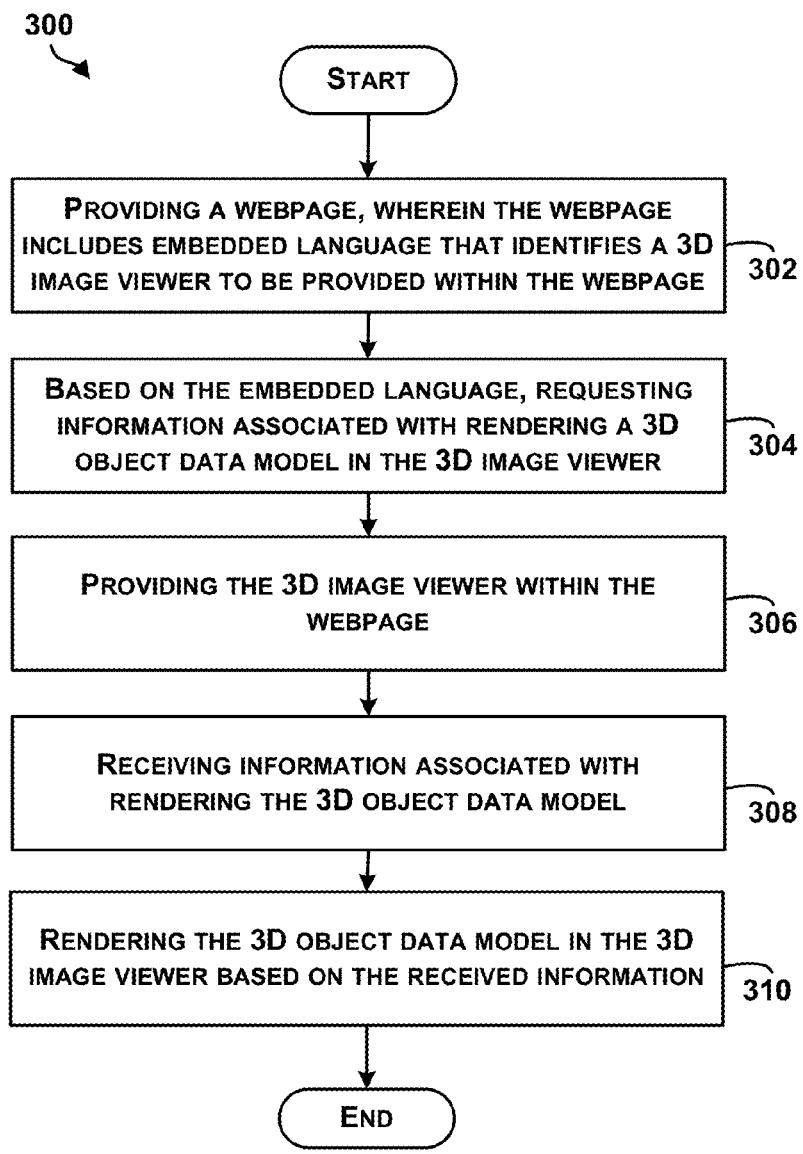
FIG. 3 is a block diagram of an example method for providing a three-dimensional (3D) image viewer within a webpage.

In one example, a client device may be configured to request information associated with rendering a 3D object data model in a 3D image viewer from a server. For instance, the request may be determined or triggered based on a portion of embedded language provided within embedded language of a webpage. FIG. 3 is a block diagram of an example method for embedding a three-dimensional (3D) image viewer in a webpage.

Method 300 shown in FIG. 3 presents an embodiment of a method that could be used by the systems 100 or 200 of FIGS. 1-2 or components of the systems 100 or 200 such as the client device 208, for example. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes providing a webpage. For example, the webpage may be provided on a client device and may include embedded language that identifies a 3D image viewer to be provided within the webpage. In some examples, the webpage may be loaded on a web browser of a desktop computer, laptop computer, tablet computer, mobile device, television, or other type of computing device. Markup language defining the webpage such as HTML or HTML5 may include a portion of code associated with a 3D image viewer to be embedded within the webpage. For example, the 3D image viewer may be embedded within an inline frame (iframe) of HMTL language enabling the 3D image viewer to be modified on the webpage without requiring the entire webpage to be updated.

In some examples, the embedded language may define customization parameters for the 3D image viewer. Example parameters include defining a size of the 3D image viewer (e.g., a pixel size or a percentage relative to a default size, full screen, etc.), a background of the 3D image viewer (e.g., an image selected from default images or custom two-dimensional image that is selected by a user), or a location of the 3D image viewer on the webpage. Other example parameters include an overlay for the 3D image viewer (such as a transparent advertisement) or an embeddable button (such as button within the 3D image viewer that a user may click or select to cause a function). In one instance, clicking an embeddable button may cause a 3D object data model within the 3D image viewer to spin or rotate. In another instance, an embeddable button may cause a 3D object data model to snap or transition to a predetermined camera position or object pose.

In other examples, the embedded language may define customization parameters for a 3D object data model to be provided within the 3D image viewer. For example, parameters may define a 3D pose, a camera position, a level of zoom, an animation sequence, an annotation for a component of the 3D object data model, a shader, a mesh resolution or size, etc., for the 3D object data model.

In some instances, the parameters for the 3D image viewer and/or the 3D object data model may be input with reference to an application programming interface (API). In one example, a computing device displaying the webpage may load one or more libraries associated with the API to provide functionality.

At block 304, the method 300 includes based on the embedded language, requesting information associated with rendered a 3D object data model in the 3D image viewer. In some examples, the embedded language may identify the 3D object data model and one or more parameters associated with rendering the 3D object data model. For instance, the parameters may be specified with reference to definitions associated with an API.

At block 306, the method 300 includes providing the 3D image viewer within the webpage. For instance, information may be received from a server extending the capability of JavaScript programming language to allow the JavaScript to provide the 3D image viewer within the webpage.

At block 308, the method 300 includes receiving information associated with rendering the 3D object data model. Information may be received from a server to allow JavaScript or other scripting languages to generate an interactive 3D object data model within the 3D image viewer. In one example, the information may be commands or function calls associated with WebGL, Open GL ES, or other graphics software for rendering real-time, interactive 3D graphics based on the parameters associated with the 3D object data model. For instance, a rendering pipeline may be used to carry out multiple draw jobs or calls within a graphics processing unit. JavaScript may be used to specify where in a 3D scene to draw a unit (such as a triangle), and how the unit should look (e.g., a color, shade, texture, etc.). The information may then be provided to the graphics processing unit which renders the scene.

At block 310, the method 300 includes rendering the 3D object data model in the 3D image viewer based on the received information. In some examples, the 3D object data model may be an interactive 3D graphic with which a user may interact. For example, a user may pan, orbit, or zoom the 3D object data model via an input device or method.

In one example, the embedded language may describe when to load or render a 3D object data model within the 3D image viewer. For example, the 3D object data model may be rendered when the webpage is loaded. In one instance, a still two-dimensional image may be loaded initially as a placeholder/substitute for the 3D object data model while the 3D object data model loads. In some instances, the still image may take a fraction of a second to load, and may be replaced once the 3D object data model has loaded (e.g., after 3 seconds).

The still image may be an image that is rendered by a server based on the parameters associated with rendering the 3D object data model and sent to the webpage. For instance, if embedded language defines a background, level of zoom, and camera position for the 3D object data model, an image of the 3D object data model having the appropriate background, level of zoom, and camera position may be rendered from the 3D object data model in the server and sent to the webpage of the client device. In other examples, the 3D object data model may be rendered when a user clicks on the embedded viewer or when a user scrolls down a webpage such that the embedded viewer is visible.

In a further instance, an indication may be provided when the 3D image has been loaded. For example, an animation sequence may begin when the 3D object data model has been loaded. As an example, the 3D object data model may rotate, hover, or wiggle, etc., after loading is complete.

In some examples, the location of the 3D image viewer may be defined within the embedded language by reserving a space in a web browser's document object model (DOM). The embedded language may also include instructions for controlling interactions with the 3D object data model. For example, JavaScript may define events based on user interface events such as a click, double-click, mouse up, mouse down, etc. over and/or near the 3D object data model. In one instance, clicking and dragging may enable a user to rotate the 3D image. It is also contemplated that the 3D object data model may be provided on other interfaces (e.g., touchscreen interfaces) and may be controlled with respect to input methods of the respective interfaces. Responses to any number of functionalities of the embedded 3D image viewer may also be defined within the embedded language.

Figure 4:
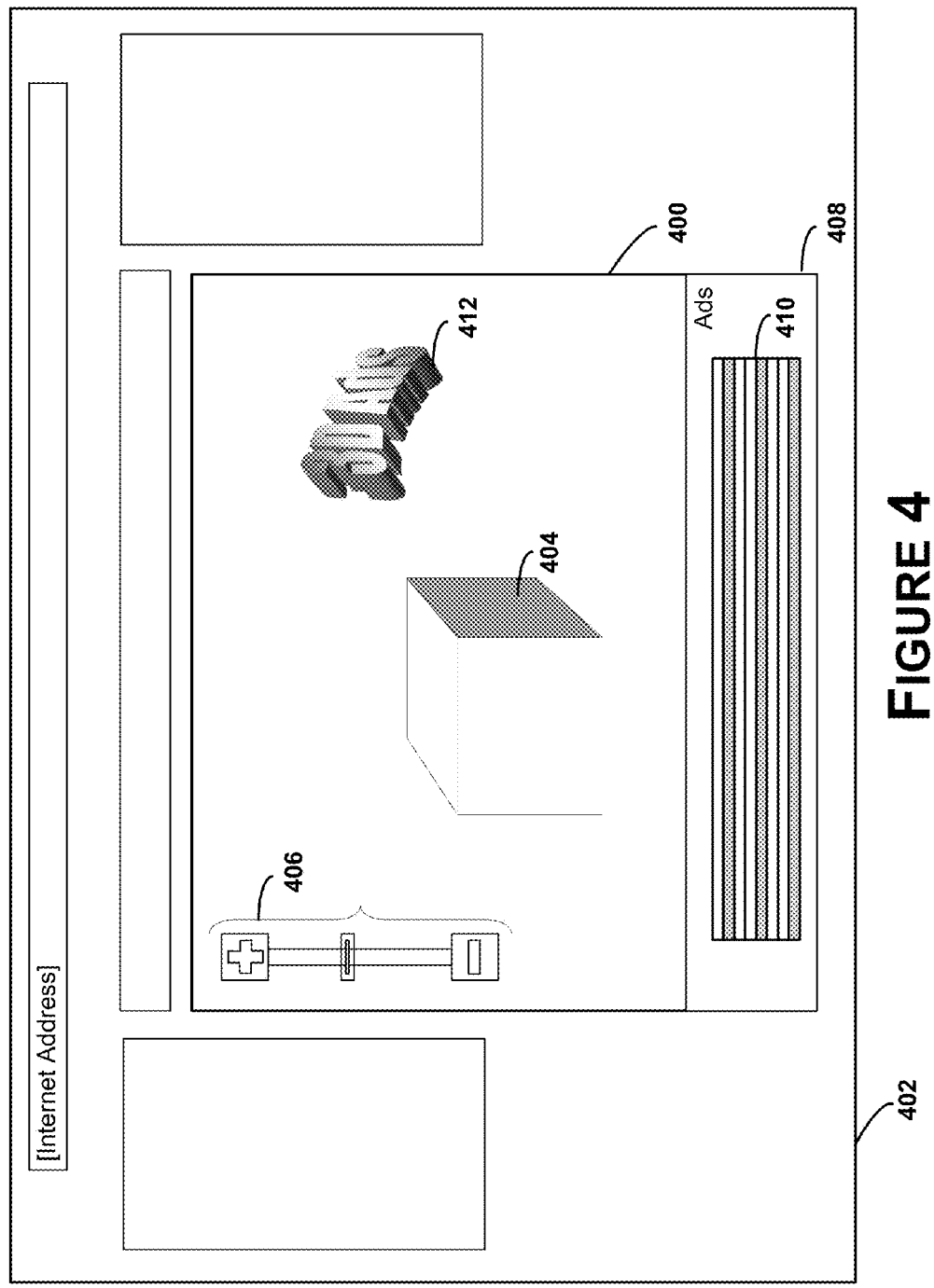
FIG. 4 shows an example display of a three-dimensional (3D) image viewer.

In some examples, the embedded language may include information associated with overlays or additional information for a 3D object data model. FIG. 4 shows an example display of a three-dimensional (3D) image viewer 400. As shown in FIG. 4, the 3D image viewer 400 may be provided within a webpage 402. The webpage 402 may include miscellaneous information and content such as textual content, graphics, hyperlinks, etc. The 3D image viewer may be configured to render a 3D image 404 representing a 3D object data model of an object. In one instance, the 3D image viewer 400 may be configured to receive a 3D object data model file from a server having data for rendering the 3D image.

The 3D image viewer 400 may include a zooming tool 406 such that a user may be able to zoom in or out to focus on features or components of the object displayed in the 3D image viewer 400. In other instances, a user may zoom on components of the object by scrolling a wheel of a mouse or providing a gesture on a touchscreen. Other tools, capabilities, and functionalities are also possible.

In one instance, the 3D image viewer 400 may include an advertisement space 408. In an example, the 3D image viewer 400 may be configured to provide advertising information 410 associated with the object depicted in 3D image 404. For example, the advertising information 410 may include text, images, audio, or video. Additionally, the 3D image viewer 400 may be configured to provide other forms of advertisements in the 3D image viewer 400. For example, the 3D image viewer 400 may provide one or more 3D advertisements 412. In one instance, the 3D advertisement 412 may be a transparent or partially transparent overlay. Additionally, or alternatively, the 3D advertisement 412 may be static or may be animated in the 3D image viewer 400. For example, the 3D advertisement 412 may move or change positions with respect to the 3D mage 402.

Figure 5A:
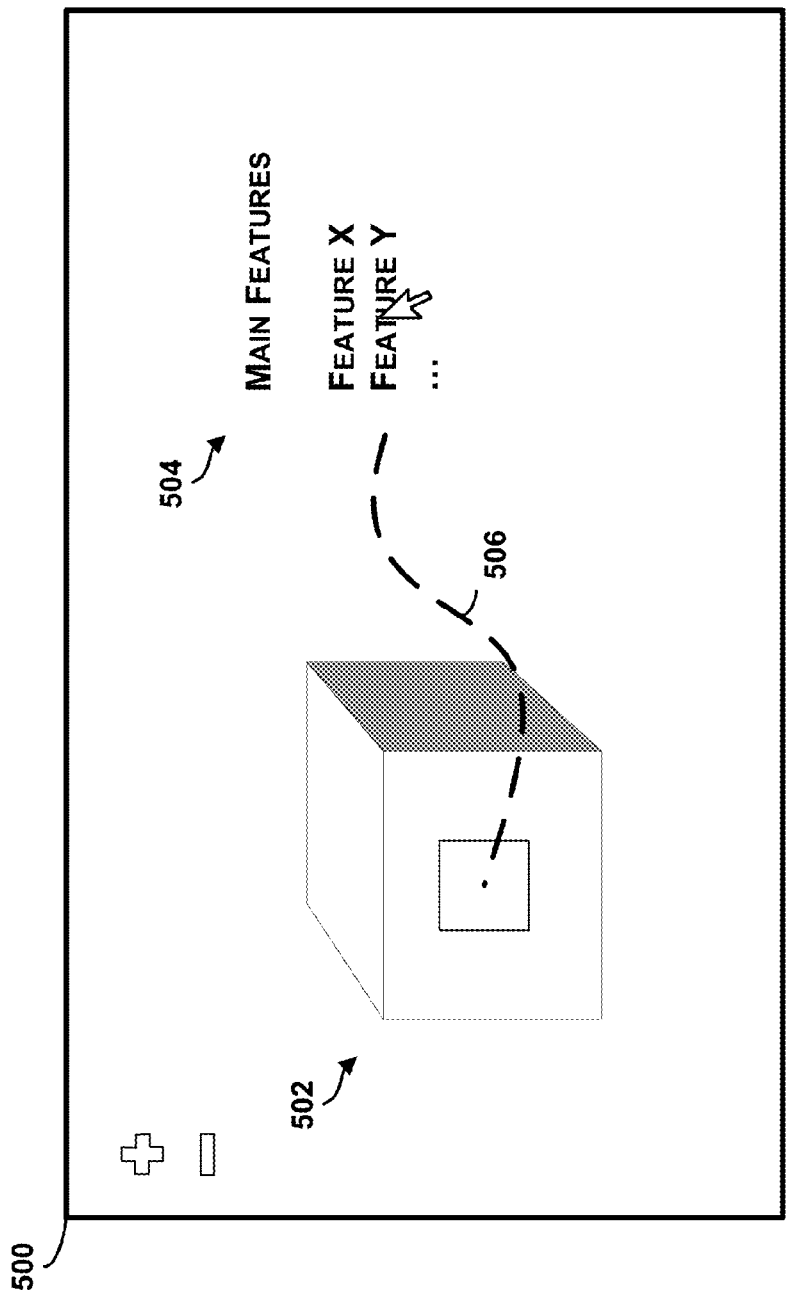
FIGS. 5A-5B show additional example displays of a three-dimensional (3D) image viewer.
Figure 5B:
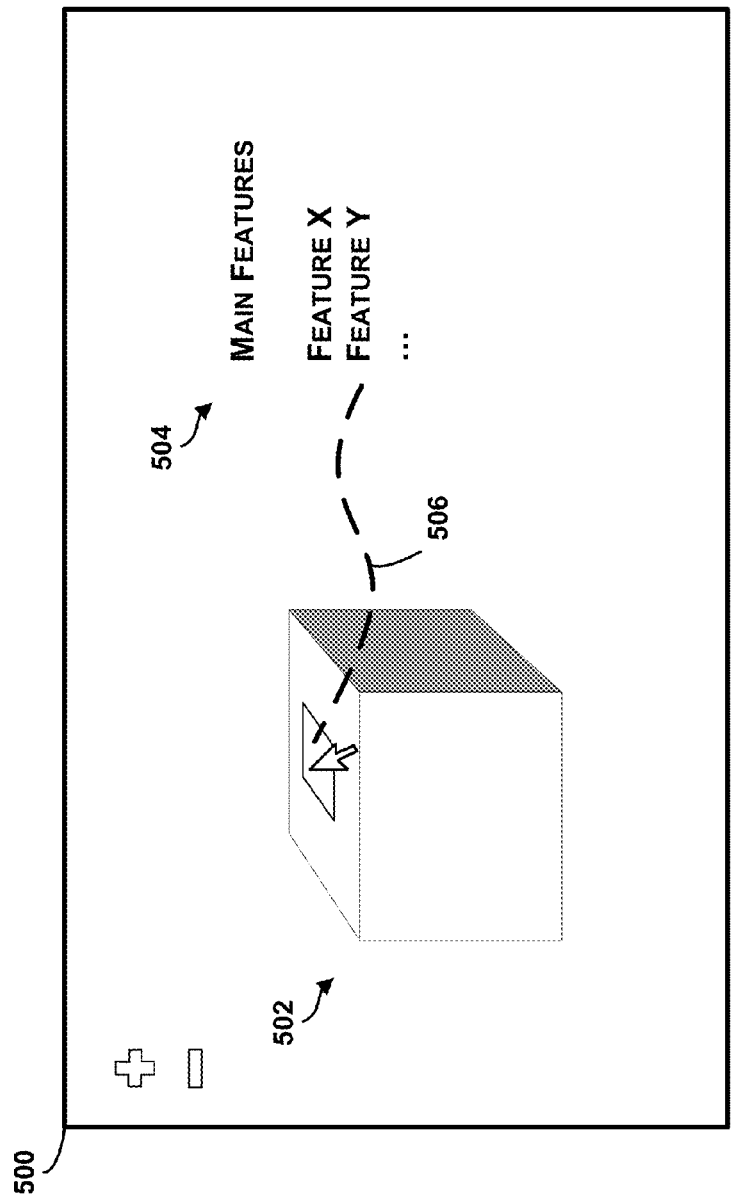

In other examples, a 3D image viewer may include additional or other types of overlays. FIGS. 5A-5B show additional example displays of a three-dimensional (3D) image viewer. As shown in FIG. 5A, a display 500 may include a 3D image 502 and an overlay 504. The overlay 504 may be defined by plain HTML (e.g., text strings with style characteristics). In some examples, embedded language associated with the 3D image viewer may describe control of the overlay 504. For example, a separate file referenced in embedded language of a webpage or associated with the 3D object data model may specify where the overlay 504 is rendered with respect to the 3D image 502.

As an example, a position of the overlay 504 may be defined relative to a position of the 3D image 502. For instance, the overlay 504 may be attached to a geometric location on or near the 3D image 502. In other examples, a position of the overlay 504 may be defined with respect to a three-dimensional coordinate space defined by the display 500 or a scene of the 3D image.

In one example, a user may click on or otherwise select a portion of the overlay 504, and an action may occur. For instance, a user may click on "Feature Y" and a line 506 may be rendered between the location of the overlay 504 and a geometric position of the "Feature Y" on the 3D image 502. In some examples, this may be accomplished based on anchors associated with the overlay 504 in the embedded language. For instance, the overlay 504 or a portion of the overlay 504 may be associated with a geometric position of the 3D image 502.

In some examples, the 3D image 502 may be in a first orientation at a first instance in time prior to the user clicking on the overlay 504. After the user clicks on the overlay 504, the 3D image 502 may animate to move to a different orientation. For instance, a camera angle of the 3D image 502 may be modified so that the 3D image 502 rotates and the "Feature Y" of the 3D image 502 is oriented towards a user (not shown).

As shown in FIG. 5B, in another example, a user may click on or otherwise indicate a position of the 3D image 502. In one instance, in response to the indication, a line 506 may be rendered from a component of the 3D image 502 to a position with respect to the overlay 504 associated with the position on the 3D image 502. Thus, in some examples, overlays within the 3D image viewer may be associated with one or more components of a 3D object data model.

Figure 6:
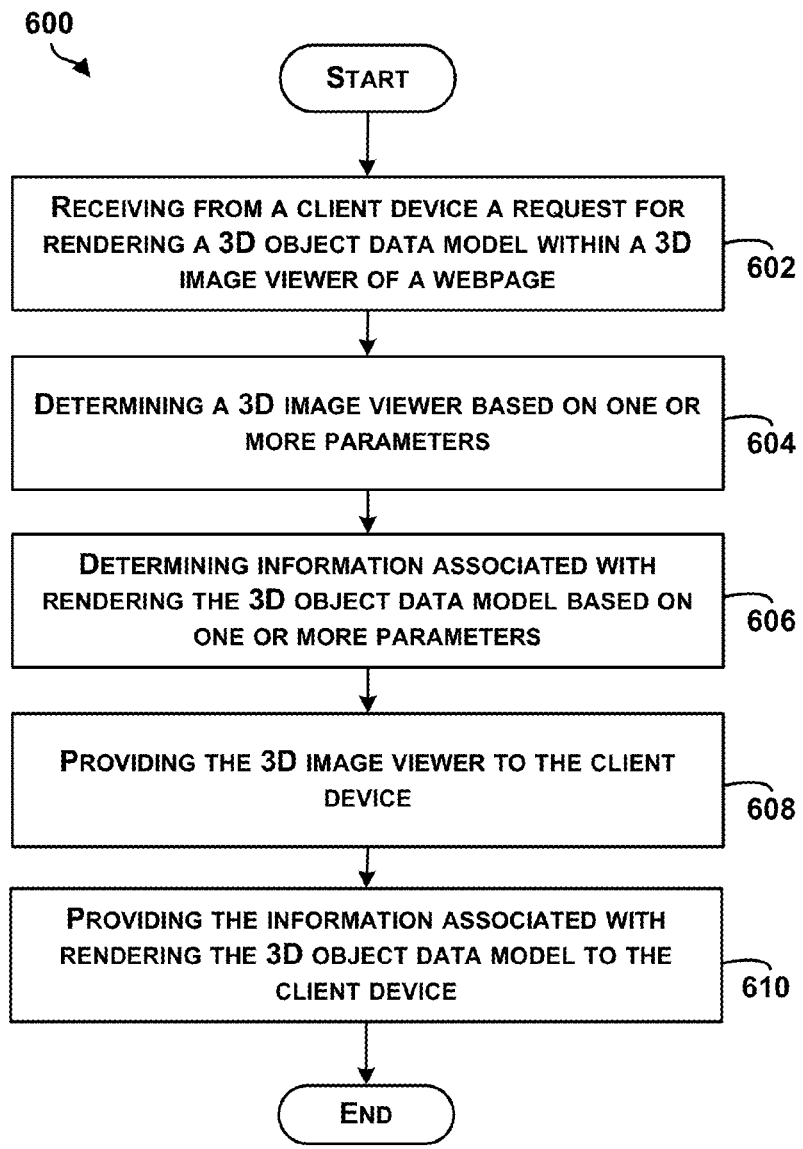
FIG. 6 is a block diagram of another example method for providing a three-dimensional (3D) image viewer within a webpage.

In some examples, a server, such as the server 100 of FIG. 1 or the server 202 of FIG. 2, may be configured to determine and provide a 3D image viewer and information associated with rendering a 3D object data model within the 3D image viewer in response to a request from a client device. FIG. 6 is a block diagram of another example method 600 for providing a three-dimensional (3D) image viewer within a webpage.

Method 600 may include one or more operations, functions, or actions as illustrated by blocks 602-610 of the flow chart. Although the blocks are illustrated in a sequential order, these blocks may also be performed in parallel, and/or in a different order than those described herein. Also, the various blocks may be combined into fewer blocks, divided into additional blocks, and/or removed from the flow chart, based upon the desired implementation of the method 600. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 602, the method 600 includes receiving from a client device a request for rendering a 3D object data model within a 3D image viewer of a webpage. In one example, the client device may communicate with the server via a wired or wireless connection. For instance, the client device may communicate with the server via the Internet or an intranet. In some examples, the request may include one or more parameters associated with the 3D image viewer (e.g., a 3D image viewer color, a 3D image viewer size, a background image, an overlay, an embeddable button, etc.) and/or one or one or more parameters associated with rendering the 3D object data model (e.g., a 3D pose, a camera position, a level of zoom, an animation, an annotation for a component of the 3D object data model, a shader, etc.). In some instances, JavaScript or other types of scripting languages may execute embedded language, such as API function calls, to communicate the request to the server.

At block 604, the method 600 includes determining a 3D image viewer based one or more parameters. For example, embedded language may identify a type of 3D image viewer, and a processor in the server may customize a default 3D image viewer based on the one or more parameters associated with the 3D image viewer. In other examples, a default 3D image viewer may be determined for the request by selecting a default 3D image viewer from a database.

At block 606, the method 600 includes determining information associated with rendering the 3D object data model based on one or more parameters. For example, a processor may locate a 3D object data model file associated with a request. In some examples, the processor may determine an appropriate resolution of the 3D object data file based on parameters associated with a request. For example, the 3D object data model file may include multiple levels of material and/or geometry information for an object that may be selected from. In some examples, the server may also render a 3D object data model based on the one or more parameters associated with the 3D object data model.

At block 608, the method 600 includes providing the 3D image viewer to the client device. In some examples, the 3D image viewer may be provided to the client device by a web server. A client device may download information from the web server to display the 3D image viewer within a web browser (e.g., within a portion of a webpage).

At block 610, the method 600 includes providing the information associated with rendering the 3D object data model to the client device. For example, information such as where to render shapes within the 3D image viewer and how the shapes should look (e.g., color texture, shades, etc.) may be provided from the server to a client device. In one instance, the information may be control codes and shader codes for execution by a WebGL program on the client device. For example, the information may allow a graphics processing unit of the client device to render a 3D image of the 3D object data model.

The method 600 may also include determining a capability level of a client device and comparing the capability level to a performance threshold. Based on a comparison of the capability level and the performance threshold, the server may also render images of the 3D object data model having views of the 3D object data model from predetermined positions around an axis of rotation of the 3D object data model. Subsequently the images may be provided to the client device and facilitate display of a swivel viewer.

As an example, embedded language associated with a request for a 3D image viewer may define a performance threshold associated with the 3D image viewer. For example, a mobile device may have a lower performance level than a desktop computer due to processing capabilities or the availability of a browser supporting WebGL or OpenGL ES. In one instance, when a request for the 3D image viewer is received from a web browser or client device that does not meet the performance threshold, instructions for rendering of the 3D object data model may be altered. For example, the 3D image viewer may be replaced by a swivel viewer, rather than an interactive, real-time 3D image viewer.

Figure 7:
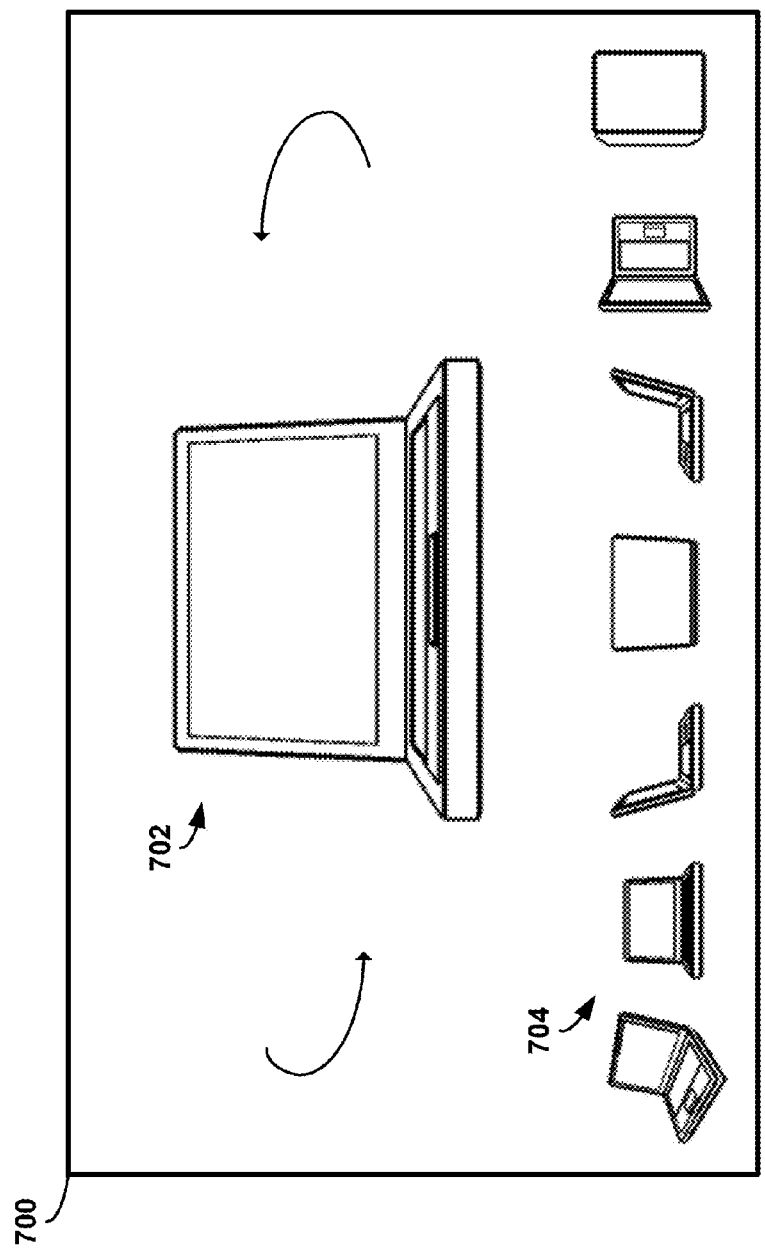
FIG. 7 shows an example display of a swivel viewer.

FIG. 7 shows an example display of a swivel viewer 700. As shown in FIG. 7, the swivel viewer 700 may be configured to display an image 702 of an object. For example, the image 702 may be an image captured from a rendering of the 3D object data model having a front camera position. In some examples, a user may click or otherwise input a modification to the swivel viewer to cause other images of the object to be displayed. For example, the other images may be images of the object rendered from separate positions around an axis of rotation of the object. In one instance, a user may click and drag to the left or right to cause the image 702 displayed by the swivel viewer 700 to change. In another example, a user may perform a gesture (e.g., a swipe) on a touchscreen interface to cause the image 702 displayed by the swivel viewer 700 to be replaced by a different image.

Additionally, the swivel viewer 700 includes multiple snapshots 704 a user may select to cause the image 702 displayed by the swivel viewer 700 to rotate to a given image. For example, the snapshots 704 may include a perspective, front, right, back, left, top, and bottom view images. In one example, a user may select a top snapshot, and the image 702 may fade out. Subsequently, an image generated based on a rendering of the 3D object data model from a top camera position may fade in. In another example, a user may select a right snapshot, and the image displayed by the swivel viewer may animate through a number of images captured between the front and right of the 3D object data model before displaying an image generated based on a rendering of the 3D object model from a right camera position. For instance, if the right snapshot is an image captured at 90 degrees and the image 702 displayed by the swivel viewer 700 is an image captured at 0 degrees, the swivel viewer 700 may sequentially display image at camera positions between 0 degrees and 90 degrees (e.g., 5 degrees, 10 degrees, 15 degrees . . . 85 degrees).

In one example implementation, 74 images of a 3D object data model may be rendered by a server. For example, a server may determine an appropriate 3D object data model based on parameters associated with a request for the 3D object data model. Images of the 3D object data model may then be generated from 72 predetermined positions covering 360 degrees around the 3D object data model. For example, images may be captured at 5 degree increments (i.e., 0 degrees, 5 degrees, 10 degrees . . . 355 degrees). Additionally, a $73^{rd}$ and $74^{th}$ image may be generated for a top and bottom of the 3D object data model by rendering the 3D object data model having a top and bottom camera position. Subsequently, the server may send the rendered images to the client device for display via the swivel viewer 700. Other example numbers of images and predetermined positions are also possible, and the example is not meant to be limiting. For instance, the swivel viewer 700 may be modified to also include images captured at predetermined positions around a second axis of rotation of the 3D object data model.

In some examples, video compression and decompression techniques may be used to reduce a data transmission size of the rendered images. For example, images of rendered views of the 3D object data model may be combined into a video and the video may be compressed using any number of video compression techniques. For example, the video compression may be lossy or lossless, and may operate on square blocks of neighboring pixels, or macroblocks. In one instance, a video compression codec may send only the difference within the macroblocks between images or frames of the video. Other types of video compression and codecs are also possible.

The compressed video may then be provided to the client device. The client device may use native decompression video techniques (e.g., decompression techniques commonly found within web browsers for streaming video) to decompress the video. Subsequently, the rendered images from the multiple views of the 3D object data model may be recovered and identified as individual images. In one example, the client device may store the individual images within a memory of the client device that can be retrieved by the swivel viewer 700 for display.

In one example, the images recovered by the swivel viewer 700 may be caused to be sequentially displayed in the swivel viewer 700. For example, the swivel viewer 700 may display each of the rendered images briefly such that the 3D object data model appears to have rotated 360 degrees. In a further instance, images recovered from the video may be progressively displayed as the images are discovered. For instance, as a rendered image is recovered the rendered image may be displayed by the swivel viewer 700. In some instances, multiple rendered images of the video may be displayed before the entire video has been received by the swivel viewer 700.

In another example, a server may render a second group of images having a higher resolution that the first rendered images. For example, the second group of images may be rendered based on a 3D object data model that is rendered having a higher zoom level, more detailed geometry, and/or more detailed material information. The second group of rendered images may also be images captured at the same predetermined positions around the axis of rotation of the 3D object data model as the first group of rendered images. Additionally, the second group of rendered images may be combined into a video, compressed by the server, and provided to the client device.

In one instance, the client device may decompress the video of the higher resolution images and recover the individual higher resolution images. In some examples, the higher resolution compressed video may be received after the first video is received, and the recovered higher resolution images may replace the first stored individual images. For instance, if the swivel viewer 700 is caused to display another rendered image of the 3D object data model after the second video has been received, the swivel viewer 700 may display a higher resolution image captured based on the same predetermined view as an originally stored image instead of displaying the original, low resolution image for the viewpoint. In some examples, providing the higher resolution images in the swivel viewer 700 may provide higher quality images of the 3D object data model that can be zoomed in on and optionally panned by a user without a discernible decrease in image quality or resolution. For instance, in one example, an image of the first group may be visibly pixelated when zoomed in on. However, a higher resolution image recovered from the second video may not be visibly pixelated when zoomed in on.

Figure 8:
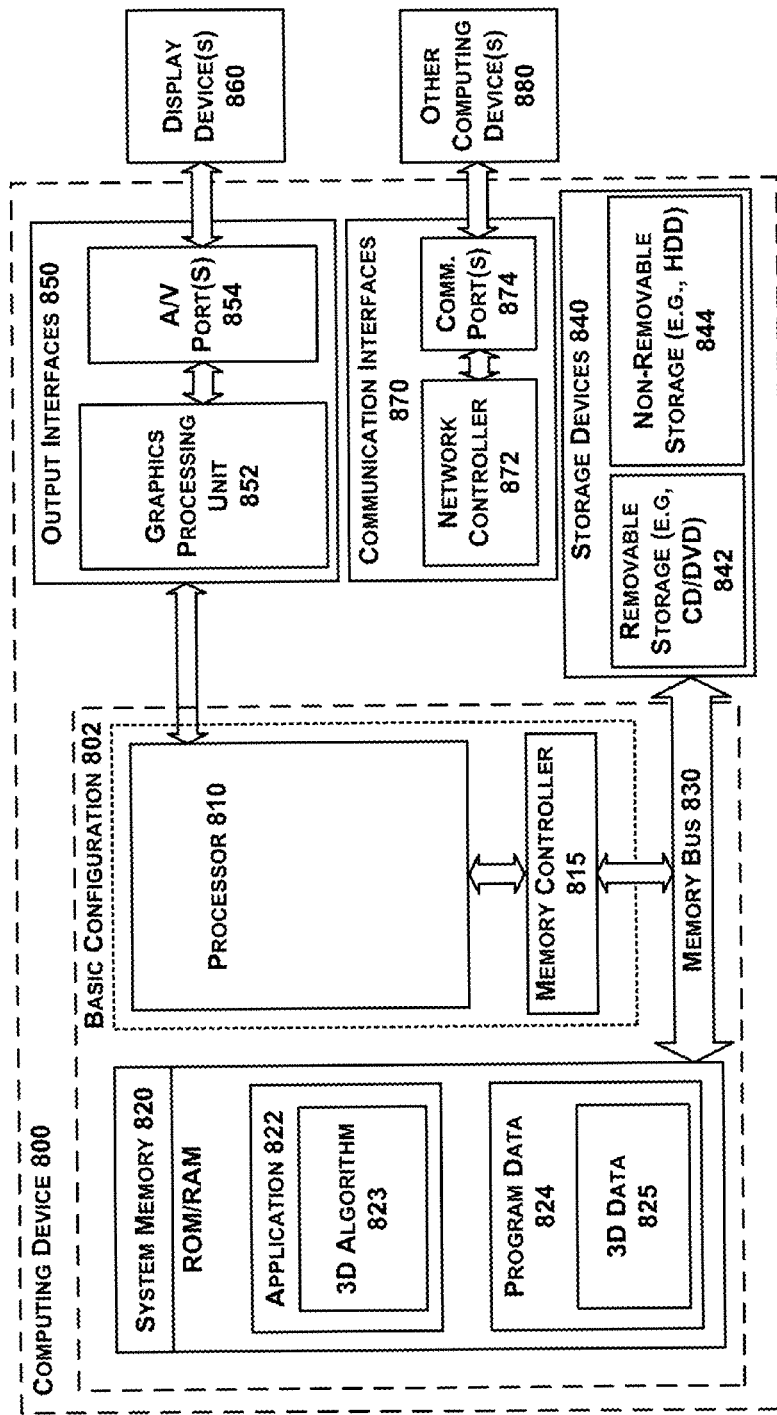
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device 800 may be a personal computer, mobile device, cellular phone, touch-sensitive wristwatch, tablet computer, video game system, or global positioning system, and may be implemented to provide a system for providing a three-dimensional (3D) image viewer in a webpage as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include a 3D algorithm 823 that is arranged to provide inputs to the electronic circuits, in accordance with the present disclosure. Program data 824 may include 3D information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

Figure 9:
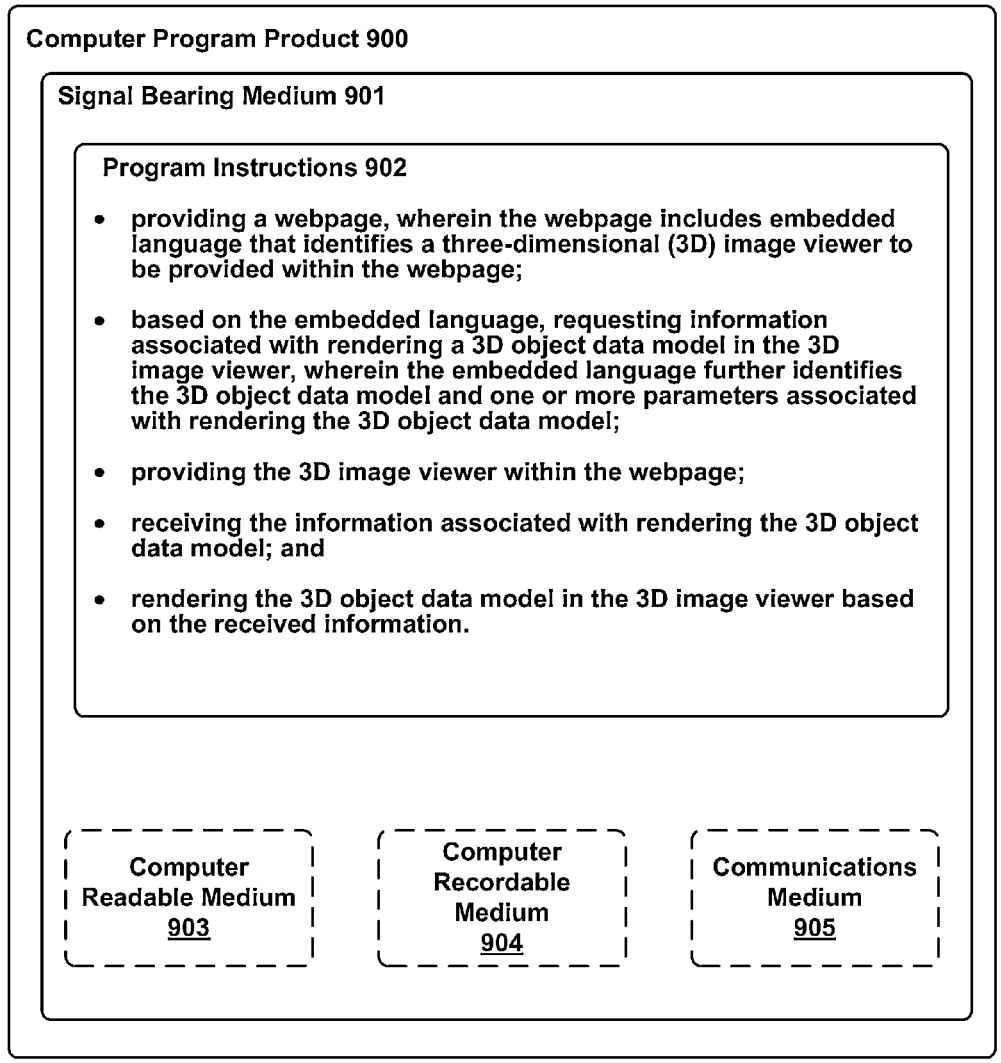
FIG. 9 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

providing a webpage, wherein the webpage includes embedded language that identifies one or more parameters associated with a three-dimensional (3D) image viewer to be provided within the webpage;

based on the embedded language, a computer having a processor and a memory requesting information associated with rendering a 3D object data model in the 3D image viewer, wherein the embedded language further identifies the 3D object data model and one or more parameters associated with rendering the 3D object data model;

providing the 3D image viewer within the webpage based on the one or more parameters associated with the 3D image viewer, wherein the one or more parameters associated with the 3D image viewer comprise one or more of a 3D image viewer color, a 3D image viewer size, a background image, an overlay, and an embeddable button;

receiving the information associated with rendering the 3D object data model; and rendering the 3D object data model in the 3D image viewer based on the received information.

2. The method of claim 1, wherein the overlay comprises an advertisement.

3. The method of claim 1, wherein the embeddable button is configured to cause the 3D object data model to be rendered based on a predetermined camera position when the embeddable button is selected.

4. The method of claim 1, wherein the embedded language comprises one or more application programming interface (API) function calls for embedding the 3D image viewer within the webpage based on the one or more parameters associated with the 3D image viewer.

5. The method of claim 1, wherein the one or more parameters associated with rendering the 3D object data model comprise one or more of the following:
a 3D pose, a camera position, a level of zoom, an animation, an annotation for a component of the 3D object data model, and a shader.

6. The method of claim 1, wherein the embedded language comprises one or more application programming interface (API) functions calls for requesting the information associated with rendering the 3D object data model based on the one or more parameters associated with the 3D object data model.

7. The method of claim 1, further comprising:
receiving a rendered image of the 3D object data model based on the one or more parameters associated with rendering the 3D object data model;
displaying the rendered image within the 3D image viewer;
replacing the rendered image with the rendering of the 3D object data model when the information associated with rendering the 3D object data model is received.

8. The method of claim 1, further comprising:
based on a comparison of a capability level of the computer and a performance threshold for the 3D image viewer, receiving a video, wherein frames of the video comprise rendered images of the 3D object data model that are associated with views of the 3D object data model from predetermined positions around an axis of rotation of the 3D object data model;
recovering the rendered images of the 3D object data model from the video;
causing the 3D image viewer to sequentially display the rendered images, wherein a first rendered image is displayed at a first instance in time followed by a subsequent rendered image that is displayed at a subsequent instance in time.

9. The method of claim 8,
wherein the received video is a compressed video; and
wherein recovering the rendered images comprises decompressing the received video.

10. The method of claim 8:
wherein the rendered images of the 3D object data model are progressively recovered from the video; and
wherein the rendered images are sequentially displayed as the rendered images are progressively recovered from the video.

11. The method of claim 8, further comprising:
causing the 3D image viewer to sequentially display a portion of the rendered images in response to a rotation input received by the 3D image viewer.

12. The method of claim 8, further comprising:
receiving another video, wherein frames of the another video comprise rendered images of the 3D object data model that are associated with views of the 3D object data model from the predetermined positions around the axis of rotation of the 3D object data model, wherein the rendered images of the another video have a higher level of resolution than the rendered images of the video;
recovering the rendered images having the higher level of resolution from the another video; and
substituting the rendered images of the 3D object data model from the video with the rendered images having the higher level of resolution.

13. A non-transitory computer-readable medium having stored therein instructions executable by a computing device to cause the computing device to perform functions comprising:
providing a webpage, wherein the webpage includes embedded language that identifies one or more parameters associated with a three-dimensional (3D) image viewer to be provided within the webpage;
based on the embedded language, requesting information associated with rendering a 3D object data model in the 3D image viewer, wherein the embedded language further identifies the 3D object data model and one or more parameters associated with rendering the 3D object data model;
providing the 3D image viewer within the webpage based on the one or more parameters associated with the 3D image viewer, wherein the one or more parameters associated with the 3D image viewer comprise one or more of a 3D image viewer color, a 3D image viewer size, a background image, an overlay, and an embeddable button;
receiving the information associated with rendering the 3D object data model; and
rendering the 3D object data model in the 3D image viewer based on the received information.

14. The non-transitory computer-readable medium of claim 13, further comprising instructions executable by the computing device to cause the computing device to perform functions comprising:
receiving a rendered image of the 3D object data model based on the one or more parameters associated with rendering the 3D object data model;
displaying the rendered image within the 3D image viewer; and
replacing the rendered image with the rendering of the 3D object data model when the information associated with rendering the 3D object data model is received.

15. The non-transitory computer-readable medium of claim 13, further comprising instructions executable by the computing device to cause the computing device to perform functions comprising:
based on a comparison of a capability level of a computer that is providing the 3D image viewer and a performance threshold for the 3D image viewer, receiving a video, wherein frames of the video comprise rendered images of the 3D object data model that are associated with views of the 3D object data model from predetermined positions around an axis of rotation of the 3D object data model;
recovering the rendered images of the 3D object data model from the video;
causing the 3D image viewer to sequentially display the rendered images, wherein a first rendered image is displayed at a first instance in time followed by a subsequent rendered image that is displayed at a subsequent instance in time.

16. A method, comprising:
receiving from a client device a request for rendering a 3D object data model within a 3D image viewer of a webpage, wherein the request comprises one or more parameters associated with the 3D image viewer and one or more parameters associated with rendering the 3D object data model;
determining a 3D image viewer based on the one or more parameters associated with the 3D image viewer, wherein the one or more parameters associated with the 3D image viewer comprise one or more of a 3D image viewer color, a 3D image viewer size, a background image, an overlay, and an embeddable button;
determining information associated with rendering the 3D object data model based on the one or more parameters associated with rendering the 3D object data model;
providing the 3D image viewer to the client device; and providing the information associated with rendering the 3D object data model to the client device.

17. The method of claim 16, wherein the one or more parameters associated with rendering the 3D object data model comprise one or more of the following:
a 3D pose, a camera position, a level of zoom, an animation, an annotation for a component of the 3D object data model, and a shader.

18. The method of claim 16, further comprising:
determining a capability level of the client device; and
based on a comparison of the capability level of the client device and a performance threshold:
rendering images of the 3D object data model having views of the 3D object data model from predetermined positions around an axis of rotation of the 3D object data model;
combining the rendered images of the 3D object data model into a video; and
providing the video to the client device.

19. The method of claim 18, further comprising:
rendering additional images of the 3D object data model having views of the 3D object data model from the predetermined positions around the axis of rotation of the 3D object data model, wherein the additional rendered images have a higher level of resolution than the rendered images;
combining the additional rendered images of the 3D object data model into another video; and
providing the another video to the client device after providing the video to the client device.

20. A system, comprising:
a client device configured to request information associated with rendering a three-dimensional (3D) object data model in a 3D image viewer from a server, wherein a webpage having embedded language is provided on the client device, and wherein a request is determined based on the embedded language; and
a server configured to:
determine a 3D image viewer and information associated with rendering a 3D object data model based on one or more parameters associated with the 3D image viewer that are received within the request, wherein the one or more parameters associated with the 3D image viewer comprise one or more of a 3D image viewer color, a 3D image viewer size, a background image, an overlay, and an embeddable button; and
provide the 3D image viewer and the information associated with rendering the 3D object data model to the client device.

21. The system of claim 20, wherein the server is further configured to determine the information associated with rendering the 3D object data model based on one or more parameters associated with rendering the 3D object data model that are received within the request.

22. The system of claim 20, wherein the server is further configured to:
determining a capability level of the client device; and
based on a comparison between the capability level of the client device and a performance threshold:
render images of the 3D object data model having views of the 3D object data model from predetermined positions around an axis of rotation of the 3D object data model;
combine the rendered images of the 3D object data model into a video; and
provide the video to the client device.

23. The system of claim 22, wherein the client device is further configured to:
recover the rendered images of the 3D object data model from the video; and
cause a 3D image viewer that is provided within the webpage to sequentially display the rendered images, wherein a first rendered image is displayed at a first instance in time followed by a subsequent rendered image that is displayed at a subsequent instance in time.

* * * * *